(12) United States Patent
Alliss

(10) Patent No.: US 8,266,805 B1
(45) Date of Patent: Sep. 18, 2012

(54) STRING TRIMMER HEAD HAVING INVERTIBLE COMPONENTS THAT ENABLE SELECTIVE CLOCKWISE AND COUNTERCLOCKWISE OPERATIONS

(76) Inventor: George Everett Alliss, Bladenboro, NC (US)

( * ) Notice: Subject to any disclaimer, the term of this patent is extended or adjusted under 35 U.S.C. 154(b) by 299 days.

(21) Appl. No.: 12/490,852

(22) Filed: Jun. 24, 2009

Related U.S. Application Data

(63) Continuation-in-part of application No. 29/307,993, filed on May 21, 2008, now Pat. No. Des. 598,255, which is a continuation of application No. 11/126,842, filed on May 11, 2005, now Pat. No. 7,412,768.

(60) Provisional application No. 60/569,990, filed on May 11, 2004.

(51) Int. Cl.
*B26B 7/00* (2006.01)
*A01D 34/416* (2006.01)
(52) U.S. Cl. .............. 30/276; 30/347; 15/12.7
(58) Field of Classification Search .......... 30/276, 30/347; 56/12.5, 12.7, 295
See application file for complete search history.

(56) References Cited

U.S. PATENT DOCUMENTS

| | | | | |
|---|---|---|---|---|
| 4,476,632 A | * | 10/1984 | Proulx | 30/276 |
| 4,835,867 A | * | 6/1989 | Collins et al. | 30/276 |
| 4,893,410 A | * | 1/1990 | Hoffmann et al. | 30/276 |
| 4,959,904 A | | 10/1990 | Proulx | |
| 5,345,683 A | | 9/1994 | Kanou | |
| 5,671,536 A | | 9/1997 | Everts et al. | |
| 5,765,287 A | | 6/1998 | Griffini et al. | |
| 5,881,464 A | | 3/1999 | Collins et al. | |
| 6,263,580 B1 | | 7/2001 | Stark et al. | |
| 2004/0134078 A1 | | 7/2004 | Pfaltzgraff | |
| 2005/0076515 A1 | | 4/2005 | Proulx | |
| 2007/0130781 A1 | * | 6/2007 | Iacona | 30/276 |
| 2009/0282687 A1 | * | 11/2009 | Arnetoli | 30/276 |

* cited by examiner

*Primary Examiner* — Laura M. Lee
(74) *Attorney, Agent, or Firm* — LaMorte & Associates, P.C.

(57) ABSTRACT

A trimmer head assembly has a housing that defines an interior. A spool is provided. The spool can be inserted into the interior of the housing either in an upright configuration or in a flipped inverted orientation. A spring is provided in the housing that biases the spool into a first position within the housing. A ratcheting mechanism exists between the spool and the housing that enables the spool to rotate only in a first direction when in said first position. The direction of rotation permitted by the ratcheting mechanism depends upon the orientation of the spool within the housing. In this manner, a single trimmer head assembly can be made to operate on a clockwise trimmer or a counterclockwise trimmer merely by inverting the spool.

3 Claims, 7 Drawing Sheets

STRING TRIMMER HEAD HAVING INVERTIBLE COMPONENTS THAT ENABLE SELECTIVE CLOCKWISE AND COUNTERCLOCKWISE OPERATIONS

RELATED APPLICATIONS

The present invention is a continuation-in-part of U.S. patent application Ser. No. 29/307,993, entitled, Bump & Feed Trimmer Head, filed May 21, 2008 U.S. Pat. No. Des. 598,255, which is a continuation of U.S. patent application Ser. No. 11/126,842, now U.S. Pat. No. 7,412,768, entitled Invertible Trimmer Line Spool For A Vegetation Trimmer Apparatus, filed May 11, 2005, which claims priority of provisional patent application No. 60/569,990, entitled Vegetation Cutting Apparatus, filed May 11, 2004. The disclosures of U.S. patent application Ser. No. 29/307,993 and U.S. Pat. No. 7,412,768 are herein incorporated into this disclosure by reference.

BACKGROUND OF THE INVENTION

1. Field of the Invention

In general, the present invention relates to string trimmers and the rotating heads of string trimmers. More particularly, the present invention relates to the mechanisms contained within string trimmer heads for winding, holding and dispensing new lengths of trimmer line when needed.

2. Prior Art Description

String trimmer machines have been commercially sold for over a quarter of a century. In this period of time, there have been many variations to the design of the string trimmer machine and especially to the trimmer head.

The trimmer head is the part of the string trimmer machine that rotates. The trimmer head holds lengths of trimmer line that rotate with the trimmer head. The rotating trimmer line contacts and cuts vegetation as it spins.

Depending upon the make, model, and manufacturer of the string trimmer machine, the trimmer head rotates either clockwise or counterclockwise during operation. The mix in the current retail market is generally an even split between clockwise and counterclockwise rotating string trimmer machines.

There are many types of trimmer heads on the market. The most common type of trimmer head is the bump-feed trimmer head. A bump-feed trimmer head contains an internal spool that holds a reserve of wound trimmer line. As the trimmer line wears away, it can be replaced from the internal spool. In a bump-feed trimmer head, a short length of line is released from the spool when the bottom of the trimmer head is impacted or "bumped" against a hard surface. Bump-activated trimmer heads are exemplified by U.S. Pat. No. 5,881,464 to Collins, entitled Line Head For Flexible Line Trimmer.

Many problems exist with traditional trimmer head designs. Primary among these problems concern the twisting of the string on the spool. Most trimmer heads contain two separate lengths of trimmer line. A trimmer head relies upon centrifugal force to pull the trimmer lines from the spool. If the trimmer lines tangle, twist or become buried under subsequent windings, the trimmer lines will not dispense in the proper manner. The trimmer head must then be disassembled, the trimmer string unwound and again rewound in the proper manner before the trimmer head will again work as designed. Furthermore, whenever the trimmer string supply is exhausted, the trimmer head must be manually disassembled. The spool is removed and rewound with a new supply of trimmer line. The spool is then reassembled back into the trimmer head. This process is difficult, labor intensive and highly time consuming. Furthermore, the entire process is often too difficult for many homeowners to complete successfully or even attempt.

Designs that attempt to overcome these problems have been proposed in the prior art. Such prior art is exemplified by U.S. Pat. No. 5,345,683 to Kanou, entitled, Rotary Cutter For Mowing Machine; U.S. Pat. No. 5,671,536 to Everts, entitled Line Feed Configuration For Line Trimmers; U.S. Pat. No. 6,263,580 to Stark, entitled Cutterhead For A Portable Handheld Brushcutter; U.S. Patent Application Publication No. 2004/0134078 to Pfalltzgraff, entitled Vegetation Cutter Device; and 2005/0076515 to Prouls, entitled, Trimmer Head For Use In Flexible Line Rotary.

U.S. Pat. No. 5,345,683 to Kanou discloses spool reloading solutions for bump and feed trimmers wherein trimmer line can be wound onto the internal spool without removing the spool from the trimmer head housing. However, the system taught by the Kanou patent requires additional user participation to anchor the trimmer line to the spool prior to winding/loading it onto the spool. Furthermore, the trimmer line spools are highly complex configurations which result in high cost manufacturing.

U.S. Pat. No. 5,765,287 to Griffini, entitled Cutting Head For Nylon-Cord Type Mowers describes a trimmer head that enables winding of a desired quantity of trimmer line onto a spool without removing the spool from the trimmer housing. In one embodiment, the device incorporates a rigid trimmer line guide tube that spans most of the diameter of the spool. Trimmer line is threaded into one trimmer line exit port in the trimmer head housing and passes through the guide tube. Upon exiting the guide tube, the trimmer line is passed through the opposite trimmer head housing exit port. When the desired length of trimmer line is threaded through the trimmer head, the installer rotates a knob integrally connected to the spool and the trimmer line is wound onto the core of the spool.

The trimmer head disclosed in the Griffini patent has certain disadvantages. The rigid trimmer line guide tube presents an obstruction in the spool chamber that hinders uniform and compact winding of the trimmer line onto the spool. Additionally, the trimmer line can also be damaged or severed as it comes into contact with the slotted edges at the opposite ends of the guide tube during winding. Furthermore, the Griffini patent, like all the prior art patents cited above, permit winding of trimmer line onto the trimmer line spool in only one direction, be it clockwise or counterclockwise, thereby limiting their practical application to a subset of the total population of powered vegetation trimmer apparatii.

The cited trimmer heads are designed to rotate in only a single direction. Accordingly, a trimmer head designed for a clockwise trimmer will not work on a counterclockwise trimmer. Furthermore, the parts from a clockwise trimmer head cannot be interchanged with any of the parts from a counterclockwise trimmer head. This requires a trimmer head manufacturer to create two sets of manufacturing tools, one for clockwise trimmer heads and one for counterclockwise trimmer heads. This significantly increases the cost associated with manufacturing trimmer heads.

U.S. Pat. No. 4,959,904 to Prouls, entitled Simple Flail Feedout Mechanism For A Rotary Mower, discloses a vegetation trimmer head that permits trimmer line to be wound onto the trimmer line spool in either a clockwise or a counterclockwise direction for appropriate clockwise or counterclockwise discharge. However, the user must engage in a cumbersome and time-consuming procedure when reloading trimmer line onto the spool. That is, a user must disassemble the trimmer housing, remove the spool, manually wind new line onto the spool, reinsert the spool into the housing, and finally reassemble the housing.

A need therefore exists for a string trimmer head that has an inexpensive yet reliable mechanism for dispensing trimmer line when needed. A need also exists for a string trimmer head that dispenses trimmer line without the trimmer line tangling, twisting, or binding. Furthermore, a need exists for a trimmer head that does not have to be disassembled to have new string added. Lastly, a need exists for a trimmer head that can be manufactured inexpensively and in a manner where many of the parts from a clockwise trimmer head are identical to parts in a counterclockwise trimmer head. These needs are met by the present invention as described and claimed below.

SUMMARY OF THE INVENTION

The present invention is a trimmer head assembly. A trimmer head assembly has a housing that defines an interior. A spool is provided. The spool can be inserted into the interior of the housing either in an upright configuration or in a flipped inverted orientation. A spring is provided in the housing that biases the spool into a first position within the housing.

A ratcheting mechanism exists between the spool and the housing that enables the spool to rotate only in a first direction when in said first position. The direction of rotation permitted by the ratcheting mechanism depends upon the orientation of the spool within the housing. In this manner, a single trimmer head assembly can be made to operate on a clockwise trimmer or a counterclockwise trimmer merely by inverting the spool. Furthermore, by using the ratcheting mechanism, new trimmer line can be wound onto the spool, simply by attaching the trimmer line to the spool and manually turning the spool. No disassembly is required.

In operation, a mechanism is provided for momentarily moving the spool from its first position in the housing to its second position. Once momentarily in its second position, the ratchet mechanism releases and the spool can turn and enable a small length of the trimmer line to unwind from the spool.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Figure 1:
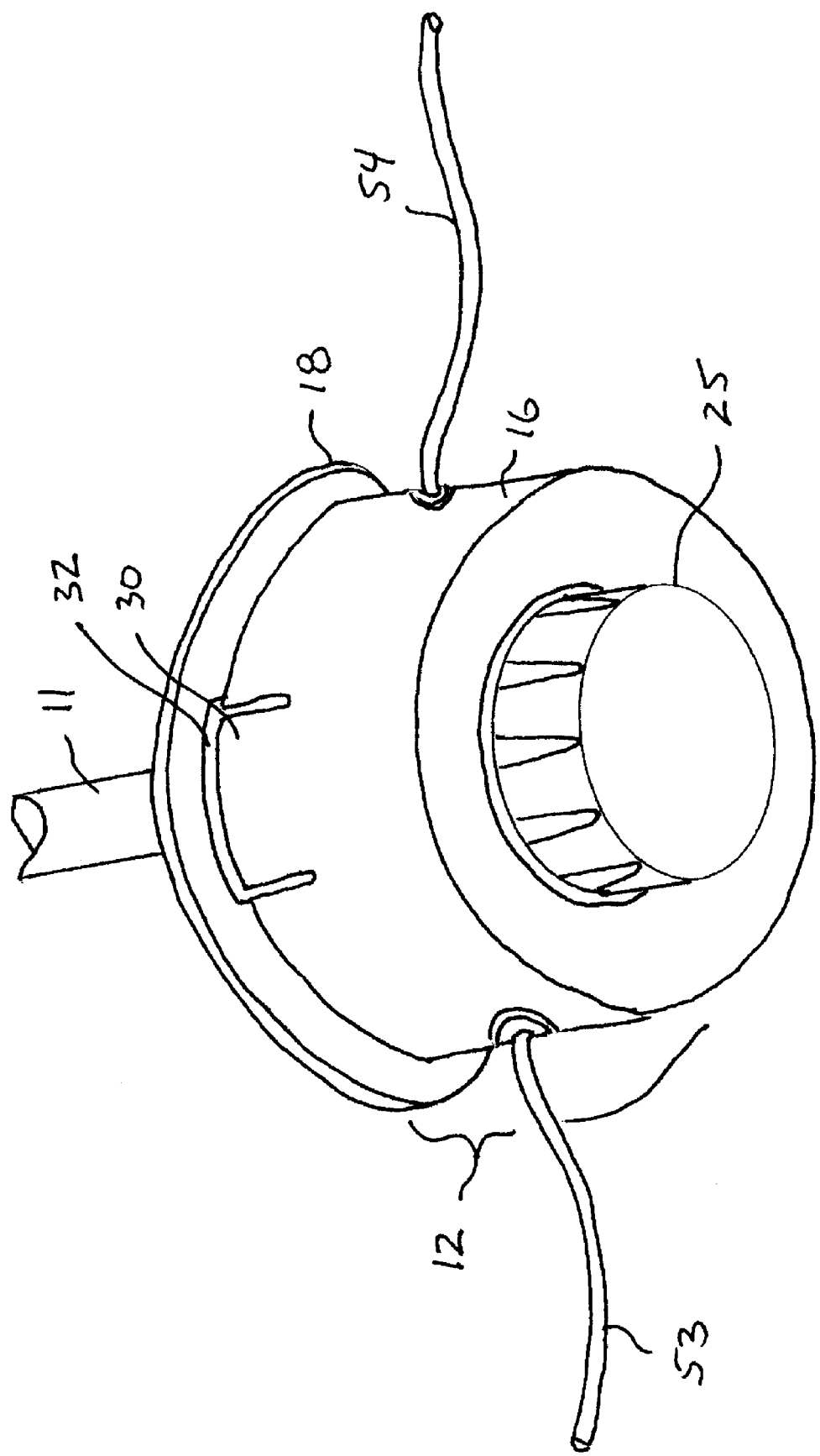
FIG. 1 is a perspective view of an exemplary embodiment of a trimmer head assembly.
Figure 2:
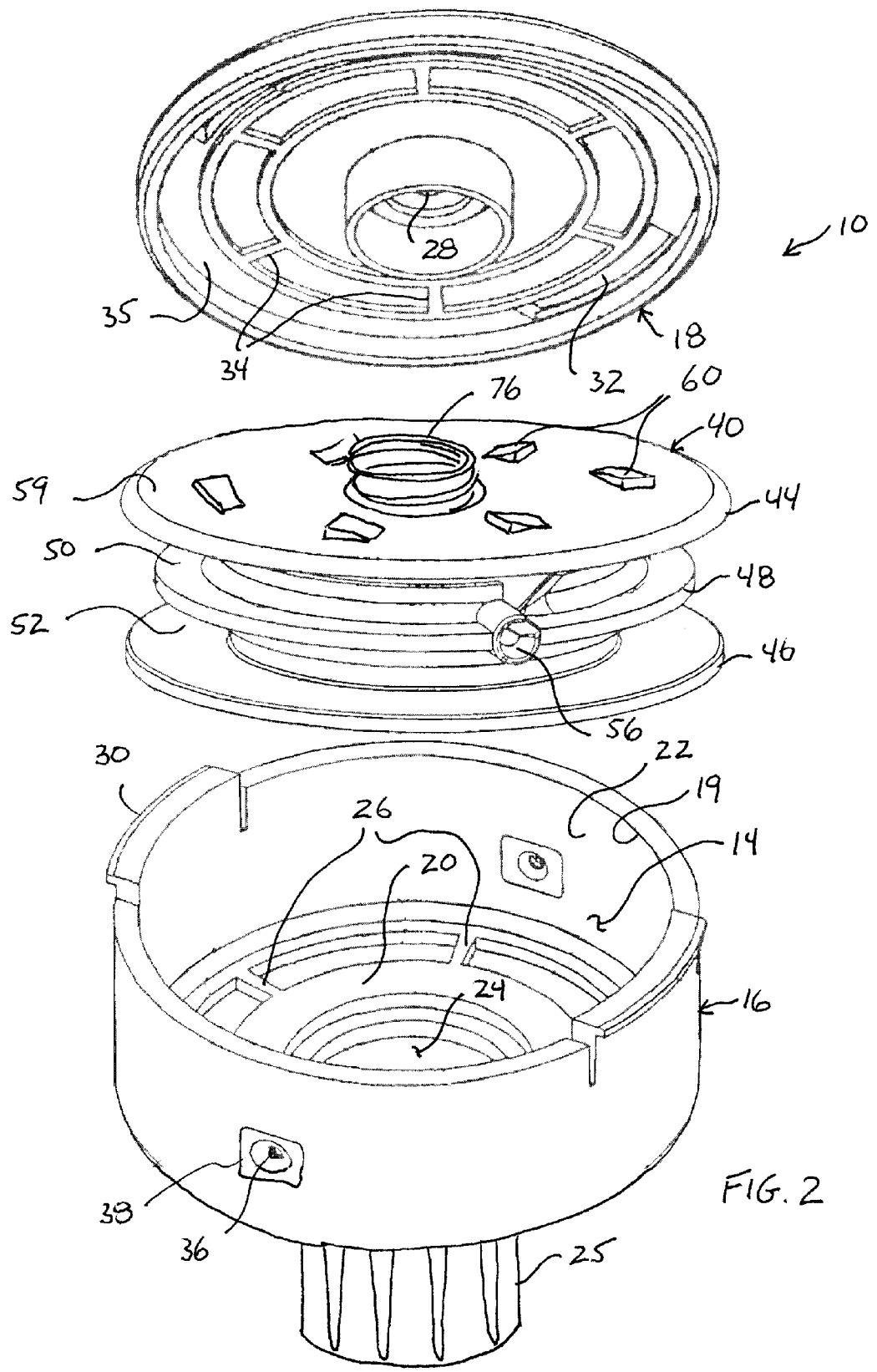
FIG. 2 is an exploded perspective view of the embodiment of FIG. 1.
Figure 3:
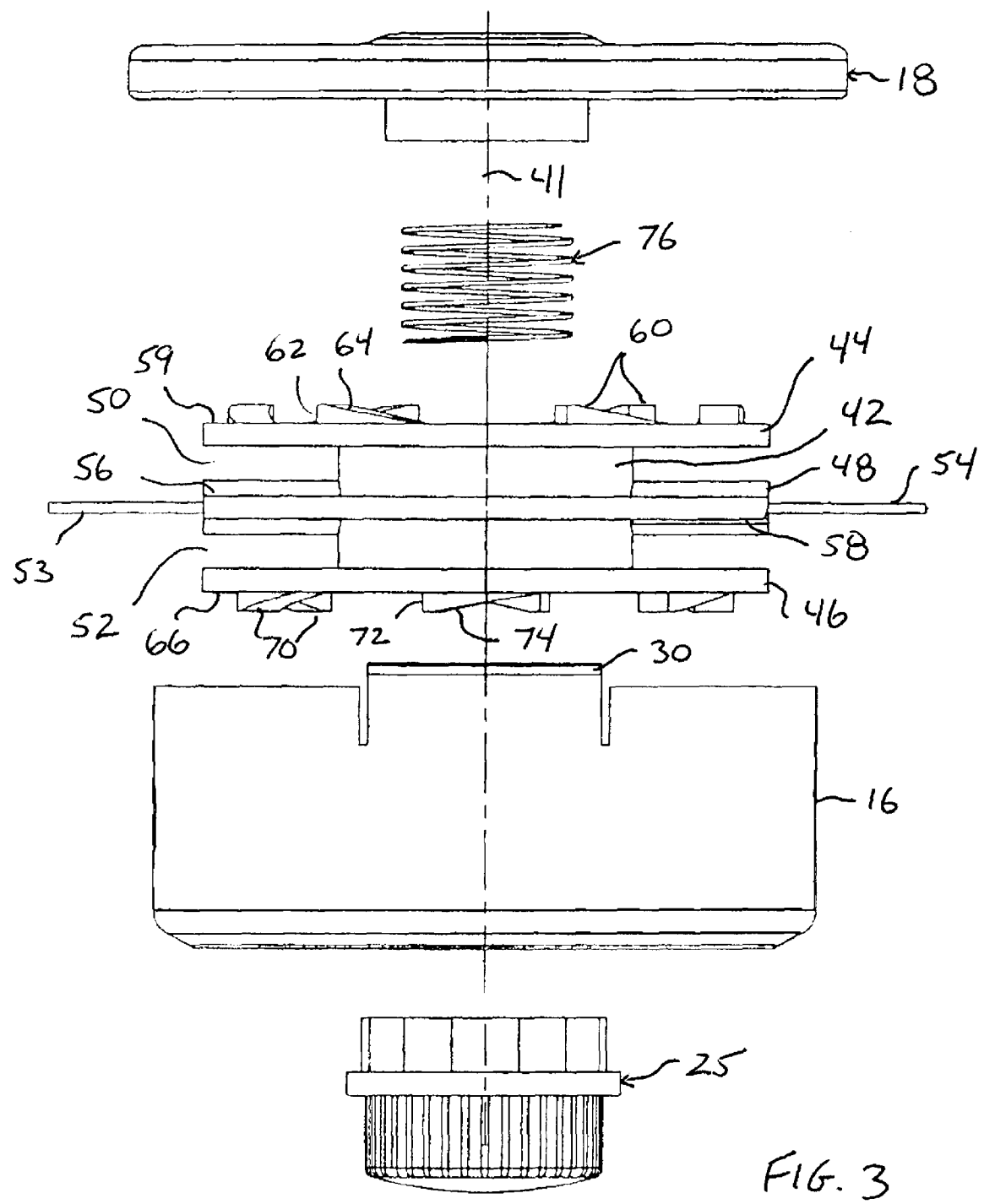
FIG. 3 is an exploded side view of the embodiment of FIG. 1.

Although the present invention trimmer head can be embodied in many ways, three exemplary embodiments are illustrated. These embodiments are selected in order to set forth the best modes contemplated for the invention and to illustrate key components. The illustrated embodiments, however, are merely exemplary and should not be considered a limitation when interpreting the scope of the appended claims.

Referring jointly to FIG. 1, FIG. 2, FIG. 3, and FIG. 4 an exemplary trimmer head assembly 10 is shown. The trimmer head assembly 10 attaches to the drive shaft 11 of a string trimmer machine (not shown), which may rotate the trimmer head assembly 10 either clockwise or counterclockwise depending upon the model of the string trimmer machine being used.

The trimmer head assembly 10 has a housing 12. The housing 12 defines an interior space 14. The housing 12 is comprised of two components, which are a cup 16 and a cap 18. The cup 16 has an open end 19 that is selectively covered by the cap 18. Together, the cup 16 and cap 18 define the interior space 14. In the shown embodiment, the cap 18 attaches to the shaft 11 of the string trimmer machine. However, as will be shown in later embodiments, the cup 16 may attach to the string trimmer machine.

The cup 16 has a base surface 20 that lies opposite the cap 18. A peripheral wall 22 extends upwardly from the edges of the base surface 20. A central opening 24 is formed in the base surface 20 of the cap 18. The central opening 24 is sized and shaped to permit a bump knob 25 to pass into the interior of the housing 12.

A plurality of cup stop projections 26 are formed on the interior base surface 20 of the cup 16. The cup stop projections 26 are symmetrically disposed about the central opening 24. The purpose of the cup stop projections 26 is later described.

The open end 19 of the cup 16 is covered by the cap 18. A mounting hole 28 is present in the center of the cap 18 that enables a bolt to join the cap 18 to the shaft 11 of a string trimmer machine. Locking fingers 30 are molded into the peripheral wall 22 of the cup 16. The locking fingers 30 extend slightly above the open end 19 of the primary housing 12. Slots 32 are formed in the cap 18. The slots 32 receive the locking fingers 30 when the cap 18 is set in place atop the cup 16. The locking fingers 30 pass into the slots 32 and lock into place. This mechanically interconnects the cap 18 to the cup 16 and couples the overall housing 12 to the string trimmer machine.

A plurality of cap stop projections 34 are formed on the interior surface 35 of the cap 18. The cap stop projections 34 are symmetrically disposed about the central mounting hole 28. The purpose of the cap stop projections 34 is later described.

At least two string ports 36 are formed through the peripheral wall 22 of the primary housing 12. The string ports 36 are diametrically opposed. If more than two string ports 36 are provided, it will be understood that the various string ports will be symmetrically disposed. The cup 16 portion of the housing 12 may contain thickened regions about each of the string ports 36 to compensate for the wearing of plastic at the string ports 36. Furthermore, optional eyelets 38 may be provided within the string ports 36. The eyelets 38 can be made from metal, ceramic, or a hard plastic that resists contact wear better than does the material of the remainder of the cup 16.

A spool 40 is held within the interior space 14 of the housing 12. The spool 40 rotates about an imaginary axis of rotation 41. The spool 40 has a cylindrical hub 42 that supports a top flange 44, a bottom flange 46, and a central flange 48. Accordingly, the spool 40 contains two separate winding chambers 50, 52 where two lengths of trimmer line 53, 54 can wind around the cylindrical hub 42. An upper winding chamber 50 is disposed between the top flange 44 and the central flange 48. A lower winding chamber 52 is disposed between the central flange 48 and the bottom flange 46.

Two line-feed conduits 56, 58 extend into the central flange 48. One line-feed conduit 56 has a side relief that leads into the upper winding chamber 50. The opposite line-feed conduit 58 has a side relief that leads into the lower winding chamber 52. The line-feed conduits 56, 58 are used to receive and engage the ends of two lengths of trimmer line 53, 54. In this manner, when the spool 40 is rotated, the two lengths of trimmer line 53, 54 will either separately wind onto, or unwind from, the upper and lower winding chambers 50, 52, respectively.

The top flange 44 on the spool 40 has a top surface 59 that faces the mounting cap 18. A plurality of ramp projections 60 extend upwardly from the top surface 59. The ramp projections 60 are symmetrically disposed on the top surface 59 at a common distance from the center of the top flange 44. Each ramp projection 60 includes a vertical segment 62 and a sloped segment 64. The vertical segment 62 and the sloped segment 64 combine to form a wedge or ramp shape. All the ramp projections 60 face a common direction along a circular path.

The bottom flange 46 on the spool 40 has a bottom surface 66 that faces the base structure 20 of the cup 16. A plurality of ramp projections 70 extend downwardly from the bottom flange 46. The ramp projections 70 are symmetrically disposed at the bottom flange 46 at a common distance from the center of the bottom flange 46. Each ramp projection 70 includes a vertical segment 72 and a sloped segment 74. The vertical segment 72 and the sloped segment 74 combine to form a wedge or ramp shape. All the ramp projections 70 face a common direction opposite that of the ramp projections 60 on the top flange 44.

The spool 40 has a symmetrical construction. The spool 40 is symmetrical about its central axis 41. Furthermore, the top half of the spool 40 is a mirror image of the bottom half of the spool 40. The only difference between the top flange 44 and the bottom flange 46 is the direction that the ramp projections 60, 70 face. It will therefore be understood that the spool 40 can be selectively inverted. By inverting the spool 40, the only physical change that occurs is that the direction of the ramp projections 60, 70 reverse.

Figure 4:
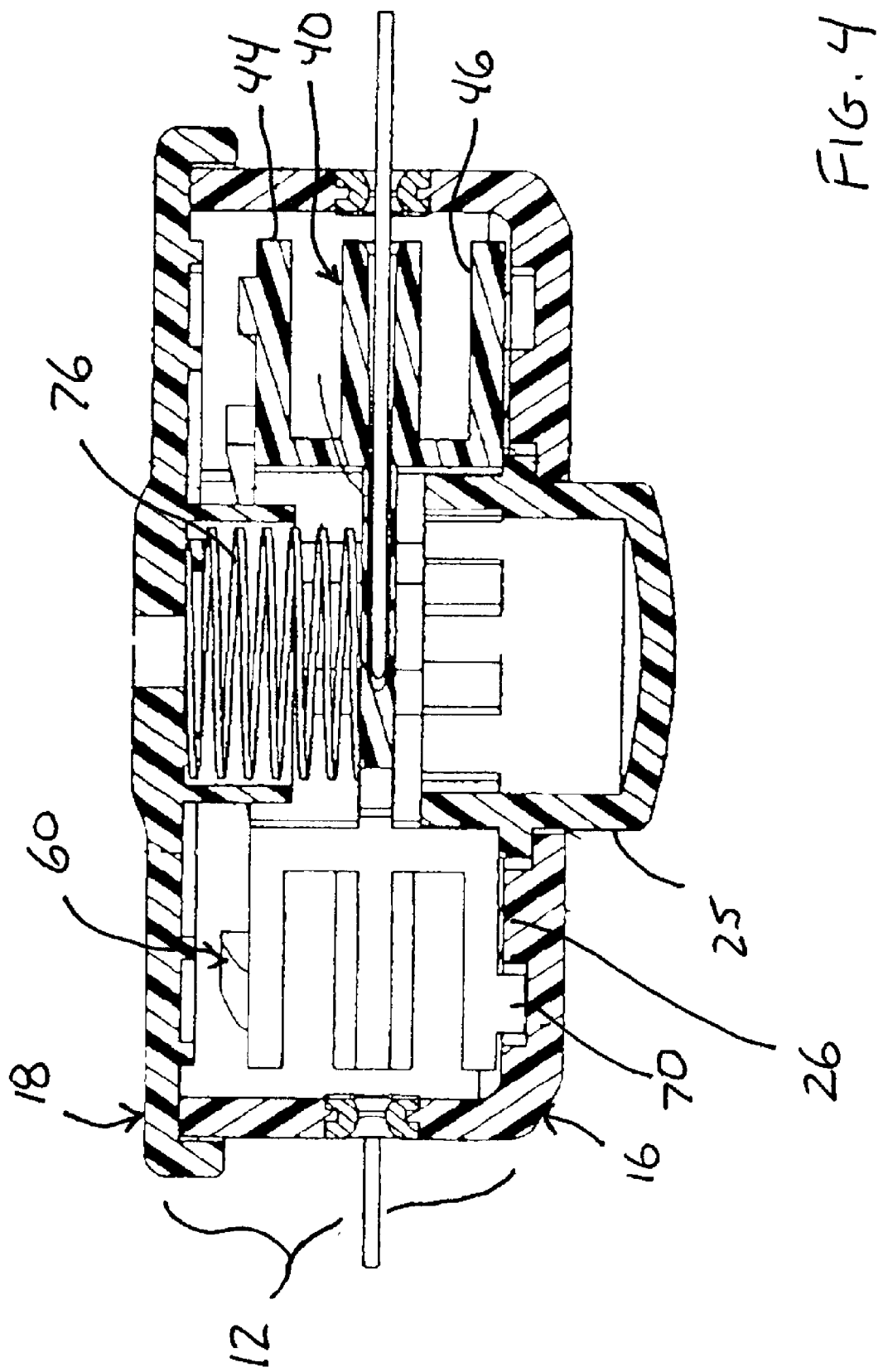
FIG. 4 is a cross-sectional view of the embodiment of FIG. 1.
Figure 5:
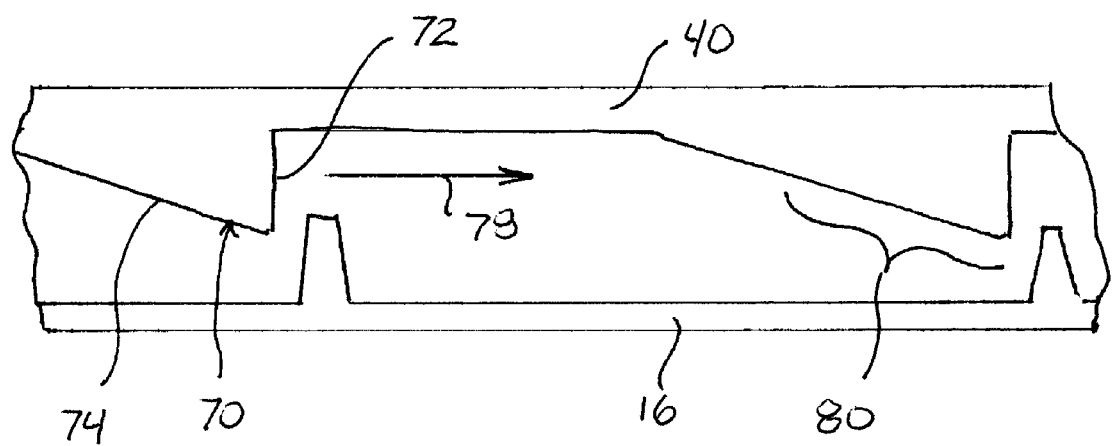
FIG. 5 is a schematic showing the relative operation of a ratcheting mechanism during a winding process.

The spool 40 is biased to the bottom of the cup 16 by a spring 76. Referring to FIG. 4 in conjunction with FIG. 5, it can be seen that when the spring 76 biases the spool 40 against the base surface 20 of the cup 16, the ramp projections 70 on the bottom flange 46 engage the cup stop projections 26 molded into that base surface 20. Due to the sloped shape of the ramp projections 70, the spool 40 can only rotate in one direction. When the spool 40 is turned in the direction of arrow 78, the cup stop projections 26 contact the vertical segment 72 of the ramp projections 70. This contact stops any further rotation of the spool 40 in that direction. However, when the spool 40 is rotated in the opposite direction of arrow 78, the cup stop projections 26 contact the sloped segment 74 of the ramp projections 70. As the spool 40 continues to rotate, the cup stop projections 26 push up the sloped segment 74, therein slightly compressing the spring 76. This raises the entire spool 40 within the housing 12 to a second position. Although the resistance increases slightly, a person can continue to rotate the spool 40 in the direction of arrow 78. The interaction of the cup stop projections 26 and the ramp projections 70 creates a one-way ratcheting mechanism 80. The ratcheting mechanism 80 enables the spool 40 to rotate indefinitely in the direction of arrow 78 and prevents rotation in the opposite direction.

In the exemplary embodiment, the direction of arrow 78 corresponds to a clockwise rotation of the spool 40. As such, the spool 40 can be manually turned clockwise and not counterclockwise. It will be understood, that by inverting the spool 40, the direction of the ramp projections 60, 70 reverses. The spool 40 would then be able to be manually rotated counterclockwise and not clockwise. Accordingly, depending upon the operational direction of spin for the string trimmer machine being used, the trimmer head 10 can be matched to the string trimmer machine merely by inverting the spool 40. All other elements of the trimmer head assembly 10 remain the same.

A bump knob 25 extends into the primary housing 12 of the trimmer head assembly 10 and engages the spool 40. The bump knob 25 extends through and below the base surface 20 of the cup 16. As such, the bump knob 25 can be easily grasped and turned. When the bump knob 25 is turned, the spool 40 turns in unison.

Referring back to FIGS. 1-4, it will be understood that in order to load trimmer line into the trimmer head assembly 10, either one or two lengths of trimmer line 53, 54 are provided. The spool 40 is manually rotated until the line-feed conduits 56, 58 on the central flange 48 align with the string ports 36 in the cup 16. If one length of trimmer line is provided, the trimmer line is inserted into one string port 36, through the central flange 48 of the spool 40 and out the opposite port. The trimmer line is pulled through the trimmer head assembly 10 until roughly equal amounts of trimmer line are present on either side of the trimmer head assembly 10. The spool 40 is then rotated by grasping and turning the bump knob 25. As the spool 40 rotates, the spool 40 winds half of the trimmer line in the upper winding chamber 50 and the other half of the trimmer line in the lower winding chamber 52. By winding the trimmer line into separate winding chambers 50, 52, all problems associated with line twisting and entanglement are removed.

If two separate lengths of trimmer line 53, 54 are provided, as is illustrated, then each length of trimmer line 53, 54 is inserted into a different line-feed conduit 56, 58 and into opposite sides of the central flange 48 of the spool 40. The spool 40 is then rotated by grasping and turning the bump knob 25 at the bottom of the spool 40. As the spool 40 rotates, the spool 40 winds one length of trimmer line 53 into the upper winding chamber 50 and the other length of trimmer line 54 into the lower winding chamber 52. By winding the trimmer lines 53, 54 into separate winding chambers 50, 52, all problems associated with line twisting and entanglement are removed.

Using either one length of line or two lengths of line, it can be seen that the trimmer line can be quickly wound onto the spool 40 without any disassembly of the trimmer head assembly 10. New trimmer line can therefore be added without tools in a simple and easy to understand procedure.

Figure 6:
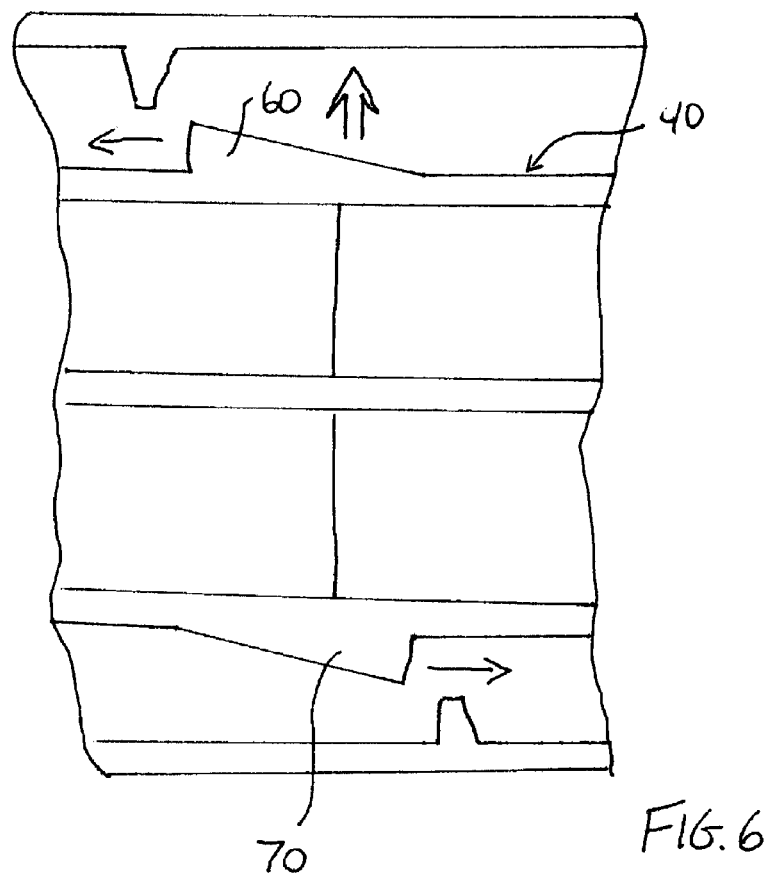
FIG. 6 is a schematic showing the relative operation of a ratcheting mechanism during a line dispensing operation.

In operation, the trimmer head assembly 10 rotates at high speeds. Eventually, the trimmer lines 53, 54 break or wear away. To advance needed trimmer line off the spool 40, the bump knob 25 is impacted against a hard surface while the trimmer head assembly 10 is spinning. Referring to FIG. 6 in conjunction with FIG. 4, it can be seen that when the bump knob 25 is impacted, the spool 40 is driven up into the housing 12 against the bias of the spring 76. For a moment, the spool 40 raises in the primary housing 12 to a position where the ramp projections 70 on the bottom flange 46 and the ramp projections 60 on the top flange 44 encounter no stops. The spool 40 is therefore free to momentarily rotate, thereby allowing trimmer line to unwind from the spool 40.

If the bump knob 25 is struck with too much force, the ramp projections 60 at the top of the spool 40 engage the cap stop protrusions 34 on the mounting cap 18 and the spool 40 stops rotating. Once the impact force dissipates, the spring 76 drives the spool 40 back down to its original first position. As the spool 40 momentarily drops out of contact with the housing 12, the spool 40 is again allowed to momentarily unwind. This enables a short length of trimmer line to dispense from the trimmer head assembly 10.

Figure 7:
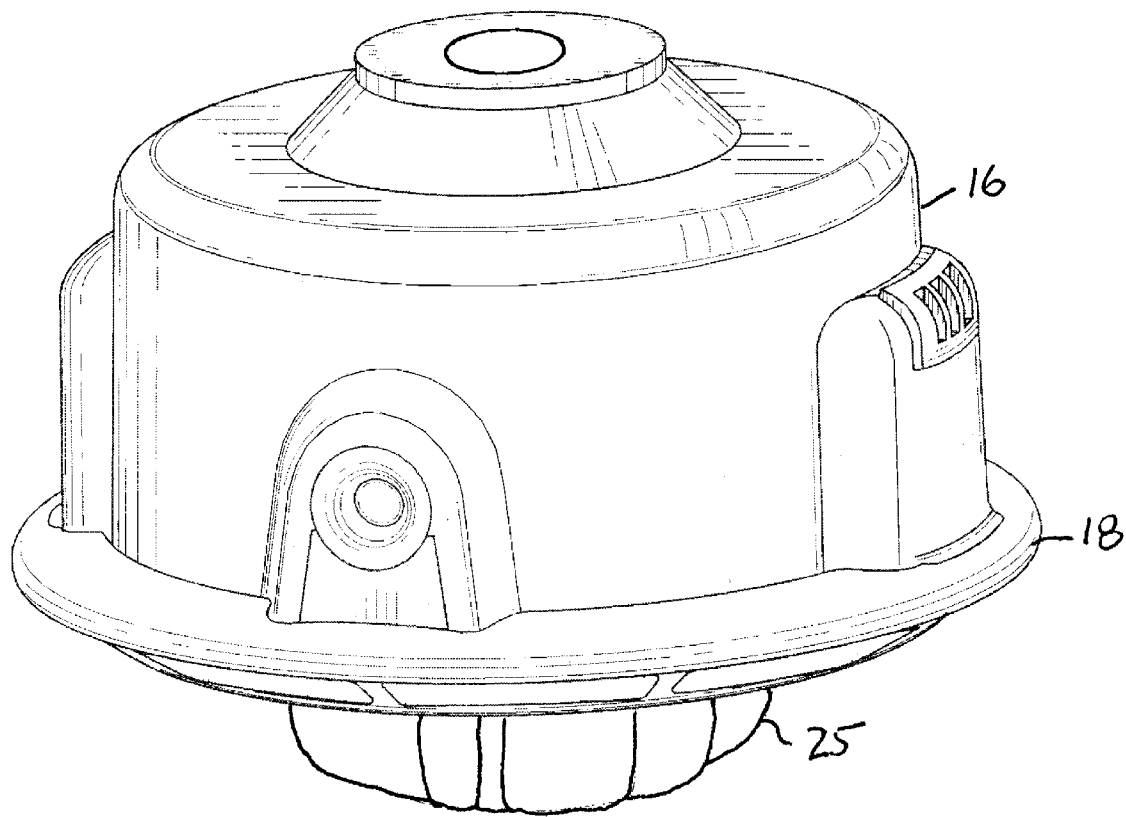
FIG. 7 is a perspective view of an exemplary second embodiment of the present invention.

In the embodiment of FIGS. 1-4, the cap 18 attaches to a string trimmer machine and the bump knob 25 extends through the cup 16. It will be understood that the mounting position of both the cup 16 and cap 18 can be reversed so that the housing 12 is in an inverted orientation when attached to the string trimmer machine. Such an embodiment is shown by FIG. 7. In FIG. 7, the cup 16 attaches to the string trimmer machine. A removable cap 18 covers the open end of the cup 16, which now faces downwardly.

The cap 18 is annular in shape having a large central hole for enabling the bump knob 25 to pass through the middle of the cap 18. Otherwise all elements contained in the embodiment of FIG. 7 are the same as those previously described.

Figure 8:
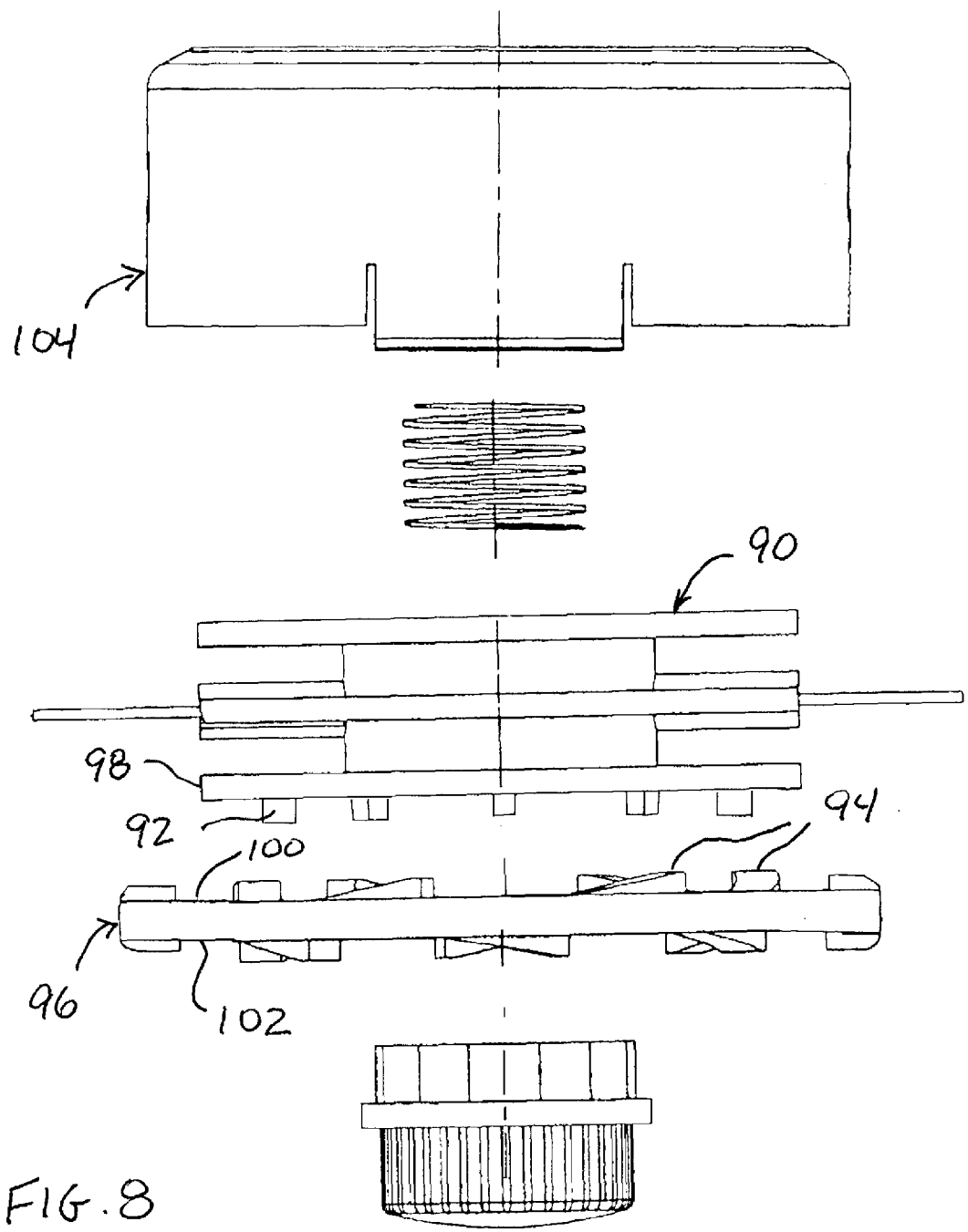
FIG. 8 is an exploded perspective view of an exemplary third embodiment of the present invention.

Referring now to FIG. 8, another variation of the present invention trimmer head is shown. In earlier embodiments, ramp projections were formed on the spool and stop projections were formed on the cap or within the cup. In the embodiment of FIG. 8, these elements are reversed so that the stop projections 92 are formed on the spool 90 and the ramp projections 94 are formed on the cap 96.

In the illustrated embodiment, a spool 90 is provided that has a bottom flange 98. A plurality of simple stop projections 92 are formed onto the surface of the bottom flange 98 that faces the cap 96.

The cap 96 has two opposite face surfaces 100, 102, like the two faces of a coin. Ramp projections 94 are formed on both face surfaces 100, 102. On one face surface 100, the ramp projections 94 face in one direction. On the opposite face surface 102 of the cap 96, the ramp projections 94 face in the opposite direction. The cap 96 can be attached to the cup 104 either in a first direction or in its inverted direction. The cap 96 is therefore reversible. By reversing the cap 96, either set of ramp projections 94 can be brought into contact with the spool 90. It will therefore be understood that the ramp projections 94 on the cap 96 interact with the stop projections on the spool 90, the spool 90 can only turn in one direction. The direction of allowable rotation can be reversed by inverting the cap 96.

It will be understood that the embodiments of the present invention that are illustrated and described are merely exemplary and that a person skilled in the art can make many variations to those embodiments. For instance, the number of ramp projections and stop projections can be varied provided the numbers for these elements remain proportional. Likewise, the shape of the bump knob, the shape of the housing and the shape of the spool can be varied into numerous configurations that are not illustrated. All such embodiments are intended to be included within the scope of the present invention as defined by the claims.

What is claimed is:

1. A trimmer head assembly that is rotated by a drive shaft of a trimmer machine, said trimmer head assembly comprising:

a housing cup having an open end wherein said housing cup is affixed to the drive shaft of the trimmer machine and is rotated by the drive shaft;

a housing cap having a first face surface and a second face surface that is selectively attachable to said housing cup over said open end in a forward orientation where said first face surface faces an interior space defined by said housing cup and said housing cap, and a reverse orientation where said second face surface faces said interior space, and wherein an opening is centrally formed through said housing cap; a spool for containing trimmer line and having stop projections that face the housing cap is disposed within said interior space;

a spring disposed within said interior that biases said spool downwardly into contact with said housing cap with a downward bias force;

a ratcheting mechanism that exists between said spool and said housing cap that enables said spool to rotate only in a first direction when said spool is biased into contact with said housing cap by said spring, said ratcheting mechanism consisting of ramp projections disposed on both said first face surface of said housing cap and said second face surface of said housing cap that respectively contact said stop projections when said housing cap is attached to said housing cup in either the forward or reverse orientation, and wherein said ramp projections on said first face surface of said housing cap are oriented in a direction opposite those on said second face surface of said housing cap; and a bump knob extending through said opening in said housing cap, wherein said bump knob is separate and distinct from said spool and contacts said spool to move said spool out of contact with said housing cap when bumped to create a upward force greater than said downward bias force provided by said spring.

2. The assembly according to claim 1, wherein said ratcheting mechanism enables said spool to rotate within said housing only in a second direction that is opposite said first direction when said spool is inverted within said interior from said first orientation to said second orientation.

3. The assembly according to claim 1, wherein said housing cup and said housing cap are selectively detachable.

* * * * *